United States Patent Office 3,111,548
Patented Nov. 19, 1963

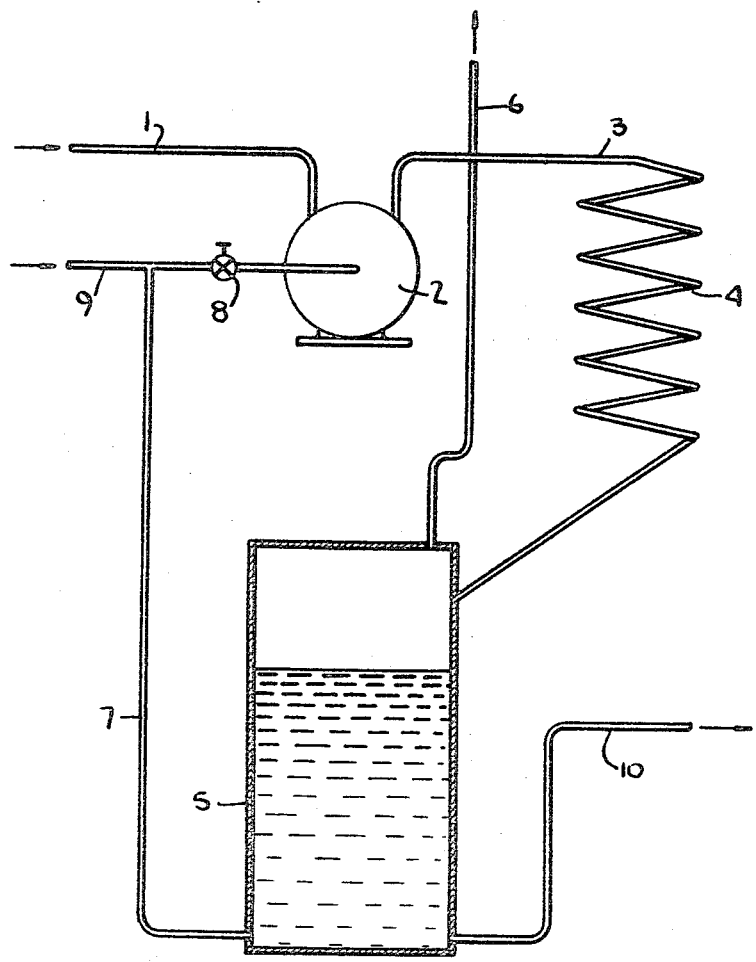

3,111,548
PROCESS FOR REACTING GASES WITH FLUIDS
Theodor Altenschöpfer, Hellmuth Spes, and Ludwig Vornehm, Burghausen, Upper Bavaria, Germany, assignors to Wacker-Chemie G.m.b.H., Munich, Germany, a corporation of Germany
Filed Jan. 29, 1960, Ser. No. 5,550
Claims priority, application Germany Feb. 13, 1959
10 Claims. (Cl. 260—684)

This invention relates to reacting gases in fluids, i.e. liquids or gases, and it has for its object to provide a novel and improved process for this purpose.

Another object of the invention is to react gases in fluids quantitatively and economically without using the voluminous washing plants, trickling towers, etc., heretofore required for such reactions.

Still another object is to provide a process of the above type in which a reactant may be a gas which is stable only in a vacuum but which reacts with satisfactory yields only at atmospheric or even higher pressure.

Various other objects and advantages will be apparent as the nature of the invention is more fully disclosed.

The usual reaction of gases in fluids requires extensive washing plants, solvents or scrubbing towers and appropriate fluid circulating pumps. If the reaction product is to run out barometrically in vacuum plants, the entire plant must be built to the required height. Since, furthermore, when working in a vacuum the vapor pressure of the reaction partners and/or reaction products usually is already so considerable that rewashing of the residual gas cannot be avoided, brine-cooled fluids are necessary in order to keep the vapor pressure as low as possible.

Special difficulties arise when the chemical conversion of a gas, which is to some extent stable only in a vacuum, and which during compression in the absence of a reaction partner reacts differently, is to be carried out with the reaction fluid at normal pressure or overpressure.

We have now found that the reaction of gases in fluids can be carried out practically in quantity without significant drop of conveying capacity, if liquid-seal rotary compressors are used for the reaction and if the fluid circulating in such pumps contains the reaction partner.

The reaction in the rotary fluid pump can be carried out with materials whose reaction product has a sufficiently high boiling point, which is a prerequisite for the desired suction effect of the pump. If the circulating fluid is cooled by brine below the temperature at which the vapor pressure of the circulating fluid is equal to the gas pressure on the suction side of the pump, then even such reactions can be carried out in the pump where the boiling point of the reaction product is relatively low, and this without the suction effect dropping to a considerable degree. If necessary, the reaction can be completed in the circulating fluid, where the circulation space must be increased appropriately.

If the reaction product itself is the reaction medium, then it is removed from the circulating fluid by means of an overflow as fast as it is formed.

Another reaction medium than can be used is an auxiliary fluid with appropriately low vapor pressure, in which the reaction product is present as well as the reaction partner in suspended, emulsified or dissolved form.

Gases and liquids are suitable as reaction partners for the sucked-up gas. If the sucked-up gas is to be brought to reaction with a liquid, the gas is sucked up on the suction side of the pump and introduced into the circulating liquid which contains the reaction partner. The fluid reaction partner is added to the circulating liquid in the quantity necessary for the reaction.

If the reaction partner for the sucked-up gas also is a gas, the gas mixture is sucked in through the suction side of the pump in order to carry out the reaction. But a gas can also be its own reaction partner. In such case only one gas has to be introduced.

The term "sucked-up gas" (or "suctioned gas" or "adsorbed gas") also includes liquid compounds separately or in a mixture, that have been vaporized by heat or vacuum.

The reaction temperature in the fluid pump can vary greatly according to the existing vapor pressure of the circulating fluid containing the reaction partner and in accordance with the occurring reaction. It can be easily established by a preliminary test.

This process offers special advantages if a gas that is stable only in a vacuum is to be subjected to a reaction which can be carried out with satisfactory conversion and yield only under atmospheric or overpressure. In that case during the compression in the pump a sufficient quantity of the reaction partner is present for the reaction, whereby an otherwise undesirable transformation of the gas cannot even start. The same applies when a gas which is stable only under normal or vacuum conditions, is processed in the pump under overpressure.

The process can be used in wide pressure ranges, which begin at around 10 Torr at the suction side and amount to about 10 atmospheres at the pressure side. If the power of the one liquid seal rotary compressor is not sufficient, several compressors can be connected in series, so that reactions can be effected under higher pressures, too.

For instance, the following reactions can be carried out with the process of the present invention: catalytic and non-catalytic oxidations by means of oxygen or oxygen transfer media in fluid phase, catalytic or non-catalytic hydrogenations by means of hydrogen, catalytic and non-catalytic polymerizations, catalytic and non-catalytic additions to numerous compounds, condensation reactions, substitution reactions, absorptions of gases in fluids during formation of secondary products.

With the apparatus described below, which essentially consists only of a liquid seal rotary compressor for fluids, a cooler and a separator, the same results can be achieved with extreme savings of space as heretofore had been for the most part possible only with spacious washing plants extending up several floors.

The accompanying drawing is a diagrammatic illustration of a preferred system for carrying out the process of the present invention.

In the drawing, a liquid-seal rotary compressor 2 is connected on its suction side with a suitable gas source (not shown) by means of gas pipe 1. A conduit 3 connects the pressure side of compressor 2 with spiral condenser 4 which takes up the compression and reaction heat. The condenser coil 4 is connected to an extractor or separator 5 from which the exhaust gas is carried off through conduits 6, if necessary through a suitable throttle valve for setting a specific reaction pressure on the pressure side of compressor 2, and the circulating fluid is returned to the compressor 2 through conduit 7 and valve 8.

The fluid reaction partner which may be necessary for the reaction with the gas is introduced into compressor 2 through conduit 9, and the formed reaction product is carried off from the circulating fluid through conduit 10 connected to the bottom of separator 5, by way of a suitable throttle valve if necessary.

The pump 2 may be any suitable liquid-seal rotary compressor (as distinguished from a reciprocating pump), which sucks or automatically draws the gas in through pipe 1 and the fluid reaction partner (from conduit 9) and the circulating fluid (from conduit 7) in through valve 3, compresses and circulates said gas and fluids together in intimate admixture in the one or more compression stages of the pump, and expels the discharge through conduit 3 on the pressure side of the pump. It is also possible to introduce the reaction partner (from conduit 9) and the circulating fluid (from conduit 7) through valve 8 into conduit 1. For example it may be a liquid-ring pump such as described in Section 154 and illustrated in FIG. 108 of "Centrifugal and other Rotodynamic Pumps" by Herbert Addison (Chapman & Hall Ltd., London, 1955). Or it may be a liquid-seal rotary compressor, such as that illustrated in FIGS. 165 and 166, pp. 213-217, of "Chemical Process Machinery" by E. R. Riegel (Reinhold Publishing Corporation, New York, N.Y., Second edition, 1953). It is possible to employ any kind of gas pump working like a liquid ring pump which simultaneously conveys gas and liquid.

The measurements of the separator 5 and its form may vary widely in accordance with the requirements of the reactions to be carried out. In some cases the gas separation and the storage of the circulating fluid can be done in separate containers, or several containers can be connected one after the other, which may be suitably equipped with heating or cooling means.

We give below a number of examples of reactions which may be carried out by our processes for reacting gases in fluids.

*Example 1*

The purpose of this example is to react ketene with acetic acid to produce acetic anhydride, using acetic anhydride as the reaction medium in the pump 2.

With a liquid seal rotary compressor 2 whose suction volume at 35 Torr amounts to 78 m.$^3$/h. of air, at a vacuum of 33 Torr therefore 3.39 Nm.$^3$/h., 5310 g./h. of ketene as 87% split gas at 33 Torr are sucked in through pipe 1, that is about 3.27 Nm.$^3$/h. The circulating fluid of the pump, initially admitted to the pump through conduit 9, consists of 25 liters of 87% acetic anhydride. The temperature of the pump 2 is kept at about 30° C. through cooling of the circulating acetic anhydride. The addition of acetic acid to the pump through conduit 9 is regulated in such a way that the content of acetic anhydride in the circulating fluid remains constant. The newly formed acetic anhydride flows off continuously through conduit 10.

Under these conditions the exhaust gas expelled through conduit 3 on the pressure side of the compressor is free of ketene (test taken between compressor 2 and cooler 4) and consequently the reaction of ketene to acetic anhydride is 100%.

*Example 2*

Reacting methyl ketene with propionic acid to form propionic acid anhydride, using propionic acid anhydride as the reaction medium.

With the same apparatus as in Example 1, but with a circulating fluid of 25 liters of 85% propionic acid anhydride, 8800 g./h. of methyl ketene are sucked through pipe 1 into compressor 2 at 38 Torr. The propionic acid required for the reaction is added to the circulating fluid by way of conduit 9. The newly formed propionic acid anhydride flows off continuously through conduit 10. In this case too the exhaust gas is free of ketene, therefore the transformation is 100%.

*Example 3*

As in the above example, 7300 g./h. of isopropyl ketene as 75% split gas are sucked up into pump 2 through pipe 1 with the help of circulating isovaleric acid anhydride at 30 Torr. Isovaleric acid is added as reaction partner, through conduit 9. As in the previous examples, the exhaust gas is free of ketene; therefore the reaction of the isopropyl ketene with the propionic acid, using isovaleric acid anhydride as reaction medium, is 100% complete.

*Example 4*

In this example we react methyl ketene with chlorine to form α-chloro-propionyl chloride, using a priming charge of α-chloro-propionyl chloride as the initial reaction medium.

With the same apparatus as described in Example 1, 8800 g./h. of methyl ketene and 11,150 g./h. of chlorine are sucked into the compressor by means of a brine-cooled quantity of circulating 25 liters of α-chloro-propionyl chloride and brought to reaction. The circulating fluid is kept at 0° C. The transformation is quantitative, neither ketene nor chlorine can be detected in the exhaust gas emerging from the compressor.

*Example 5*

Reacting ethylene with bromine to form ethylene bromide, utilizing hexachlorbutadiene as an "auxiliary" reaction medium.

With a liquid-seal rotary compressor whose suction volume at 80 Torr amounts to 6.2 liters/min. when operating with water at 15° C. and consequently 0.37 Nm.$^3$/h. at a vacuum of 80 Torr, 232 g. (=8.3 mol=186 l.) of ethylene and 1330 g. (=8.3 mol=about 186 l.) of bromine vapor are sucked up per hour at 85 Torr. The auxiliary circulating fluid of the pump consists of hexachlorbutadiene. The temperature of the pump is kept at about 15° C. The reaction mixture, consisting of ethylene bromide and hexachlorbutadiene flows off continuously through conduit 10.

If the dosage of ethylene and bromine is exact, no exhaust gas can be found at the presure side of the pump 2. The absorption and reaction is in this case quantitative, too.

During extended operation the hexachlorbutadiene is gradually displaced from the circulating fluid, so that afterwards the fluid overflowing through conduit 10 consists only of ethylene bromide. But if a constant concentration of hexachlorbutadiene is to be maintained, hexachlorbutadiene must be added to the circulation (through conduit 9) at the same rate as the latter flows off through the overflow.

*Example 6*

Reacting ammonia with ethyl acetoacetate (acetoacetic acid ethyl ester) to form β-amino-ethylcrotonate (β-aminocrotonic acid ethyl ester) using the end product as reaction medium.

With the same apparatus as described in Example 5, 282 g. (=16.5 mol=370 l.) of ammonia are sucked up per hour by means of a circulating fluid quantity of 6500 g. of β-amino-ethylcrotonate. 2150 g. (16.5 mol) of ethyl acetoacetate are added per hour to the circulating fluid. The pump temperature is kept at 35° C. The β-amino-ethylcrotonate being formed by the reaction of ammonia with ethyl acetoacetate flows off continuously together with the water formed during the reaction.

The transformation is quantitative, no ammonia being expelled at the pressure side of the pump.

*Example 7*

This is an example of utilizing a gas (acetaldehyde) as its own reaction partner, in the presence of a catalyst (sulphuric acid) to form paraldehyde which is a polymer of the starting material.

With the same pump as in Example 5, 725 g. (=16.5 mol) of acetaldehyde vapor are sucked up per hour by means of circulating paraldehyde. This corresponds to a volume of 370 l./h. At the same time sulphuric acid is added as catalyst to the circulating fluid at such a rate that a constant catalyst concentration of 1% is maintained. The pump temperature is kept at around 20° C. The newly created raw paraldehyde flows off continuously through the overflow. No acetaldehyde escapes through the pressure side of the pump, the absorption of the gas by the fluid is therefore 100%.

The invention claimed is:

1. Process for reacting a gas with a fluid to produce a liquid reaction product, which comprises circulating a liquid reaction medium through a liquid seal rotary compressor from the suction to the pressure side of the latter, drawing said gas into the suction side of said compressor into admixture with said reaction medium, continuously discharging the mixed fluid content of said compressor from the pressure side thereof, and continuously separating the liquid reaction product from the mixed fluid so discharged.

2. Process according to claim 1, in which said liquid reaction medium is the reaction product itself.

3. Process according to claim 1, in which the liquid reaction medium circulating in said compressor is an auxiliary liquid which is different from the reaction product and does not react with said gas.

4. Process according to claim 1, in which a fluid reaction partner for said gas is also drawn into the suction side of said compressor and is intimately mixed with said gas within the liquid reaction medium while in said compressor.

5. Process according to claim 4, in which the reaction partner reacting with said gas is also a gas.

6. Process according to claim 4, in which said liquid reaction medium circulating in said compressor is an auxiliary liquid in which said gas, said reaction partner and said reaction product are carried while in said compressor.

7. Process according to claim 4, in which the liquid circulating through said compressor is cooled to a temperature below that at which the vapor pressure of said circulating liquid equals the gas pressure at the suction side of said compressor.

8. Process according to claim 4, which comprises condensing the mixed fluid content discharged from said compressor, separating and withdrawing liquid reaction product from said condensed fluid, and continuously feeding condensed reaction medium into the suction side of said compressor.

9. Process according to claim 8, in which the condensed reaction product is separated from said condensed fluid in an extractor and overflows from said extractor according to its rate of discharge from said compressor.

10. Process for reacting a gas with another fluid to produce a reaction product, which comprises initially circulating a quantity of said liquid reaction product through a liquid seal rotary compressor to serve as a reaction medium, drawing said gas and said other fluid into the suction side of said compressor into admixture with the reaction medium circulating therein, continuously discharging the fluid content of said compressor from the pressure side thereof, continuously separating liquid reaction product from the fluid so discharged from said compressor, and continuously returning part of said liquid reaction product into the suction side of said compressor.

References Cited in the file of this patent
UNITED STATES PATENTS

| | | |
|---|---|---|
| 1,994,714 | Johnson et al. | Mar. 19, 1935 |
| 2,260,834 | Everett | Oct. 28, 1941 |
| 2,318,341 | Thompson | May 4, 1943 |
| 2,350,095 | Carlson et al. | May 30, 1944 |
| 2,601,322 | Reese | June 24, 1952 |
| 2,806,768 | Bender et al. | Sept. 17, 1957 |
| 2,864,827 | Baer et al. | Dec. 16, 1958 |
| 2,955,026 | Hollings et al. | Oct. 4, 1960 |
| 2,970,038 | Hyde | Jan. 31, 1961 |

OTHER REFERENCES

Riegel: Chemical Process Machinery, pages 213–217 (1953).

Addison: Centrifugal and Other Rotodynamic Pumps, pages 187–188 (1955).